United States Patent Office 2,815,352
Patented Dec. 3, 1957

2,815,352

PRODUCTION OF PHTHALIC ANHYDRIDE

Adolf Johannsen and Rolf Luehdemann, Ludwigshafen (Rhine), Germany, assignors to Badische Anilin- & Soda- Fabrik Aktiengesellschaft, Ludwigshafen (Rhine), Germany No Drawing. Application August 8, 1955,
Serial No. 527,143

Claims priority, application Germany August 7, 1954

4 Claims. (Cl. 260—346.4)

This invention relates to an improved process for the production of phthalic anhydride. More particularly the invention deals with an improved method of manufacturing phthalic anhydride by oxidizing naphthalene with air while a catalyst kept in fluidized motion is used.

In the usual catalytic method for the production of phthalic anhydride, naphthalene vapor is led in admixture with air over a vanadium catalyst which is usually stationarily arranged in tubes which are surrounded by a bath for withdrawal of the heat of reaction. The gas leaving the catalyst chamber contains, besides phthalic anhydride vapor, the residual air and also small amounts of naphthoquinone, maleic acid, carbon monoxide, carbon dioxide and steam. The gas from the reaction chamber is cooled in large separation chambers, solid crude phthalic anhydride thus being obtained in a yield of about 87% of the theoretical yield. For safety reasons it is preferable to keep the content of naphthalene in the air below the lower explosion limits of naphthalene-air mixtures, i. e. at 150° C. not to exceed a content of 51 grams, at 300° C. 44 grams and at 350° C. 40 grams of naphthalene per cubic metre (0° C., 760 Torr.) of air.

The said process has the disadvantage that very large separation chambers are necessary in order to ensure complete separation of the reaction product from the air. It is also a disadvantage that the naphthalene must be completely reacted in a single passage through the reaction chamber, unless it is to be lost with the waste gases or in the purification of the crude phthalic anhydride. This is attained by the use of relatively high reaction temperatures of about 350° to 380° C. On the other hand the combustion to carbon dioxide is hereby favored so that higher yields of phthalic anhydride than the abovementioned yields cannot be achieved.

It has also already been proposed to produce phthalic anhydride by leading naphthalene vapor in admixture with air through a layer of catalyst kept in fluidized motion. In order to withdraw the heat of reaction, cooling coils in which water under pressure is heated or evaporated are arranged at the walls or in the interior of the catalytic reaction chamber.

In this process it is also very difficult to completely separate the reaction product from the air and to react the naphthalene completely in a single passage through the fluidized layer of catalyst.

It is an object of this invention to overcome these disadvantages and to provide an improved method of producing phthalic anhydride by the oxidation of naphthalene with air in vapor phase.

Another object is to provide a process of oxidizing naphthalene to phthalic anhydride with air while a catalyst kept in fluidized motion is used and the gaseous vaporous reaction mixture is recycled.

These and other objects which will be apparent from the more detailed description of the invention are accomplished by oxidizing naphthalene with air in vapor phase in the presence of a solid catalyst kept in fluidized motion and recycling the gaseous-vaporous reaction mixture while partly separating the formed phthalic anhydride from the recycled mixture and supplying fresh amounts of naphthalene to the reaction mixture.

Suitable catalysts for this reaction are, for instance, vanadium pentoxide, if desired on a carrier, such as silica gel, kieselguhr, pumice, alumina, corundum or any other usual catalyst carrier. The catalyst may contain potassium sulfate. The grain size of the catalyst particles may be between 16 and 325 mesh, preferably between 20 and 100 mesh. The type of catalyst used is not a particular feature of this invention.

The catalyst being fluidized by a stream of air the velocity of which is kept between about 9 to 75 centimetres per second (0.3 to 2.5 ft. per second) may have a bulk density of about 240 to 640 grams per liter (15 to 40 pounds per cubic foot). The catalyst fluidized in this manner resembles a boiling liquid.

The gaseous-vaporous mixture leaving the reaction zone is cooled preferably to a temperature not below 132° C. but sufficient to form a mixture containing a part of the phthalic anhydride in liquid or solid form. Said liquid or solid phthalic anhydride is separated and the uncondensed part of this mixture is then led back to the catalyst kept in fluidized motion in the reaction zone. Contemporaneously, additional naphthalene is fed to the reaction zone.

The separation of the phthalic anhydride from the circulating mixture preferably takes place in liquid form. The phthalic anhydride thus separated contains only small amounts of naphthoquinone, naphthalene and maleic acid because these impurities are more readily volatile than phthalic anhydride.

A complete separation of phthalic anhydride in liquid form is not possible because it remains in the air at least with a partial pressure corresponding to a vapor pressure of 7.0 Torr. at the melting point of 132° C., i. e. at least 61 grams of phthalic anhydride are contained in every cubic metre (0° C., 760 Torr.) of air. This fraction is again led over the catalyst according to this invention. There is no reduction in the yield thereby because the naphthalene freshly added to the residual gas oxidizes more readily than the phthalic anhydride. It is preferable to maintain in the fluidized layer of catalyst a lower average temperature than would otherwise be usual, for example 330° to 350° C., the more complete conversion of the naphthalene and naphthoquinone at higher temperatures being disregarded because of the repeated passage of the gas through the catalyst layer. The amount of naphthalene which can be added to the residual gas depends on the lower explosion limit, which at 400° C. is 73.2 grams of phthalic anhydride per normal cubic metre of air. Thereafter by a single passage of the returned gas over the catalyst at the said temperature, $$73.2 - 61.0 = 12.2$$

grams of phthalic anhydride per normal cubic metre of air, i. e. about 17% of the phthalic anhydride being circulated, can be separated in liquid form, and by repeated return in circulation up to about 50% of the phthalic anhydride formed in all can be separated in liquid form.

Furthermore, by this circulatory method, the oxygen content of a given amount of air is utilized better than by a single passage of the gas through the catalyst layer. Whereas, for example, in the oxidation of 87% of the naphthalene to phthalic acid by the method hitherto usual, the oxygen content of air containing 40 grams of naphthalene per normal cubic metre only falls from 20.9 to 17.1% by volume, it is possible by the circulatory method herein disclosed to utilize the oxygen content of the air down to about 8% by volume or even less without appreciable retardation of the reaction speed taking place.

Therefore 80 grams or even more of naphthalene can be brought into reaction with 1 normal cubic metre of air. The falling content of oxygen and the increasing content of carbon dioxide and steam in the gas mixture, displaces the lower explosion limit in a favorable sense. The vaporous mixture poorer in oxygen returned in circulation can thus have a higher content of phthalic anhydride than is possible without danger when using normal air. Thus at each passage of the returned gas through the catalyst layer, more phthalic acid than stated above can be separated in liquid form.

The better utilization of the oxygen content of the air furthermore has the consequence that the amount of air necessary for a given production needs only amount to half of the amount of air otherwise usual when using 80 grams of naphthalene per normal cubic metre of air or only one third when using 120 grams of naphthalene per normal cubic metre of air. Consequently the separation chambers for the solid phthalic anhydride can be reduced to half or one third of the volume otherwise necessary.

Having regard to the use of lower temperatures in the catalyst chamber in the circulatory method according to this invention, it is often preferable to lead the residual gas from the circulation over an annexed catalyst in order to react residues of naphthalene and naphthoquinone to phthalic anhydride and to separate the latter in the preferred solid form.

The process in accordance with our invention will now be described in greater detail in the following example, the catalyst used consisting of silica gel as a carrier substance and containing 5.5% of vanadium pentoxide and 35% of potassium sulfate. 80% by weight of the catalyst have a particle size of between 28 and 48 mesh. It is to be understood that the invention is not limited to any particular catalyst composition.

*Example*

In a reactor the catalyst is charged on a grid, the catalyst bed being about 1.5 meter in height. Into this bed air recycled from a separation chamber in which phthalic anhydride formed in this process is liquified, is introduced from below. Into this stream which contains 11.3% by volume of oxygen and 61 grams of phthalic anhydride, 34 grams of naphthalene per normal cubic meter are introduced before the stream enters the catalyst bed. The vaporous mixture is catalytically converted at 345° C. and at a velocity of 36 centimeters per second and then passed through a cyclone separator while containing 96 grams per cubic meter of phthalic anhydride and 8% by volume of oxygen. The lower explosion limit of said mixture is not reached as it lies at 400° C. The vaporous mixture is now cooled in separation chambers in which 35 grams of phthalic anhydride per normal cubic meter, i. e. a yield of 103% by weight based on naphthalene, or 89.2% of the theoretical yield are condensed. As thus one normal cubic meter of air which contains 20.9% of oxygen by volume serves to oxidize 136 grams of naphthalene, 255 liters of vaporous mixture containing 8% of oxygen by volume have to be drawn off the cycle for one normal cubic meter of recycled vaporous mixture, and replaced by fresh air. This mixture which contains 11.3% by volume of oxygen is led back to the reactor, where it serves to oxidize further quantities of naphthalene. The quantity of vaporous mixture drawn off the cycle contains besides phthalic anhydride small quantities of naphthalene and naphthoquinone. This residual gas is passed over a small catalytic converter to convert the residues of phthalic anhydride which is separated in the solid form and constitutes 45% of the whole production, which 55% are separated in the liquid form.

We claim:

1. In a process of manufacturing phthalic anhydride wherein naphthalene is oxidized in vapor phase with air in a fluidized solid catalyst reaction zone to produce a vaporous-gaseous reaction mixture containing phthalic anhydride, the improvement which comprises partly separating phthalic anhydride from the vaporous-gaseous reaction mixture, recycling the residual portion of said reaction mixture to said reaction zone, and supplying a fresh amount of naphthalene to said residual portion.

2. In a process of manufacturing phthalic anhydride wherein naphthalene is oxidized in vapor phase with air in a fluidized solid catalyst reaction zone to produce a vaporous-gaseous reaction mixture containing phthalic anhydride, the improvement which comprises partly condensing phthalic anhydride in liquid form from the vaporous-gaseous reaction mixture, recycling the residual portion of said reaction mixture to said reaction zone, and supplying a fresh amount of naphthalene to said residual portion.

3. In a continuous process of manufacturing phthalic anhydride wherein naphthalene is oxidized in vapor phase with air in a fluidized solid catalyst reaction zone to produce a vaporous-gaseous reaction mixture containing phthalic anhydride, the improvement which comprises cooling the vaporous-gaseous reaction mixture to a temperature not below 132° C. but sufficient to partly condense phthalic anhydride in liquid form, separating and recovering the liquid phthalic anhydride product, recycling the residual portion of said reaction mixture to said reaction zone, replacing part of said residual portion with fresh air, and supplying a fresh amount of naphthalene to said residual portion.

4. A process of manufacturing phthalic anhydride which comprises oxidizing naphthalene in vapor phase with air in a fluidized vanadium pentoxide catalyst reaction zone at a temperature of from about 330° C. to 350° C. to produce a vaporous-gaseous reaction mixture containing phthalic anhydride, cooling said reaction mixture to a temperature of about but not lower than 132° C. to partly condense phthalic anhydride in liquid phase, separating the liquid phthalic anhydride product, recycling the residual portion of said reaction mixture to said reaction zone, and supplying a fresh amount of naphthalene to said residual portion.

References Cited in the file of this patent

UNITED STATES PATENTS

| | | |
|---|---|---|
| 1,321,959 | Weiss | Nov. 18, 1919 |
| 2,489,347 | Rollman | Nov. 29, 1949 |

OTHER REFERENCES

Groggins: "Unit Processes in Org. Synthesis," 3rd Edition (1947), pages 457 and 481.